US009204486B2

(12) United States Patent
Xhafa et al.

(10) Patent No.: US 9,204,486 B2
(45) Date of Patent: Dec. 1, 2015

(54) COEXISTENCE OF WIRELESS SENSOR NETWORKS WITH OTHER WIRELESS NETWORKS

(71) Applicant: TEXAS INSTRUMENTS INCORPORATED, Dallas, TX (US)

(72) Inventors: Ariton E. Xhafa, Plano, TX (US); Soon-Hyeok Choi, Allen, TX (US); Srinath Hosur, Plano, TX (US); Yanjun Sun, San Diego, CA (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 161 days.

(21) Appl. No.: 13/852,174

(22) Filed: Mar. 28, 2013

(65) Prior Publication Data
US 2013/0259016 A1 Oct. 3, 2013

Related U.S. Application Data

(60) Provisional application No. 61/618,041, filed on Mar. 30, 2012.

(51) Int. Cl.
*H04J 1/16* (2006.01)
*H04W 84/18* (2009.01)
*H04W 72/12* (2009.01)
*H04W 88/06* (2009.01)

(52) U.S. Cl.
CPC .......... *H04W 84/18* (2013.01); *H04W 72/1215* (2013.01); *H04W 88/06* (2013.01)

(58) Field of Classification Search
USPC .................. 370/235, 252, 254, 338
See application file for complete search history.

(56) References Cited

U.S. PATENT DOCUMENTS 7,154,854 B1 * 12/2006 Zweig et al. .................. 370/236
7,796,536 B2 * 9/2010 Roy et al. ...................... 370/254
8,204,515 B2 * 6/2012 Dishongh et al. .......... 455/456.5
(Continued)

OTHER PUBLICATIONS

Andrew Tinka, A decentralized scheduling algorithm for time synchronized channel hopping, 201-216,2010.*
(Continued)

*Primary Examiner* — Phuc Tran
(74) *Attorney, Agent, or Firm* — Steven A. Shaw; Charles A. Brill; Frank D. Cimino

(57) ABSTRACT

A wireless device includes a wireless transceiver configured to transmit to and receive from nodes in a wireless sensor network (WSN) and control logic coupled to the first wireless transceiver. The wireless transceiver transmits a wireless packet to a node in the WSN based on the transmission coinciding with a break in transmissions for a second wireless network. Based on the wireless transceiver being configured to transmit the wireless packets utilizing time synchronized channel hopping, slot frames for packet transmissions in the WSN are time offset so as not to coincide with transmissions made on the second wireless network. Based on the wireless transceiver being configured to transmit the packets utilizing coordinated sampled listening, wake up sequence transmissions for the WSN are time offset so as not to coincide with the transmissions made on the second wireless network.

17 Claims, 3 Drawing Sheets

(56) References Cited

U.S. PATENT DOCUMENTS

| | | | |
|---|---|---|---|
| 8,619,620 B2* | 12/2013 | Medvedev et al. | 370/253 |
| 2009/0006910 A1* | 1/2009 | Hamzeh | 714/704 |
| 2011/0267966 A1* | 11/2011 | Gao et al. | 370/252 |
| 2012/0155326 A1* | 6/2012 | Park et al. | 370/254 |
| 2013/0039212 A1* | 2/2013 | Li et al. | 370/253 |
| 2013/0315217 A1* | 11/2013 | Chen et al. | 370/336 |

OTHER PUBLICATIONS

Maria Rita Palattella, traffic aware scheduling algorithm for relaable low-power multi-hop IEEE 802.15.4e networks,978-1-4673-2569-1/12/$31.00 @2012 IEEE.*

Samuel Zats, Scalability of time synchronized wireless sensor networking, 978-1-61284-972-0/11/$26.00 @2011 IEEE.*

* cited by examiner

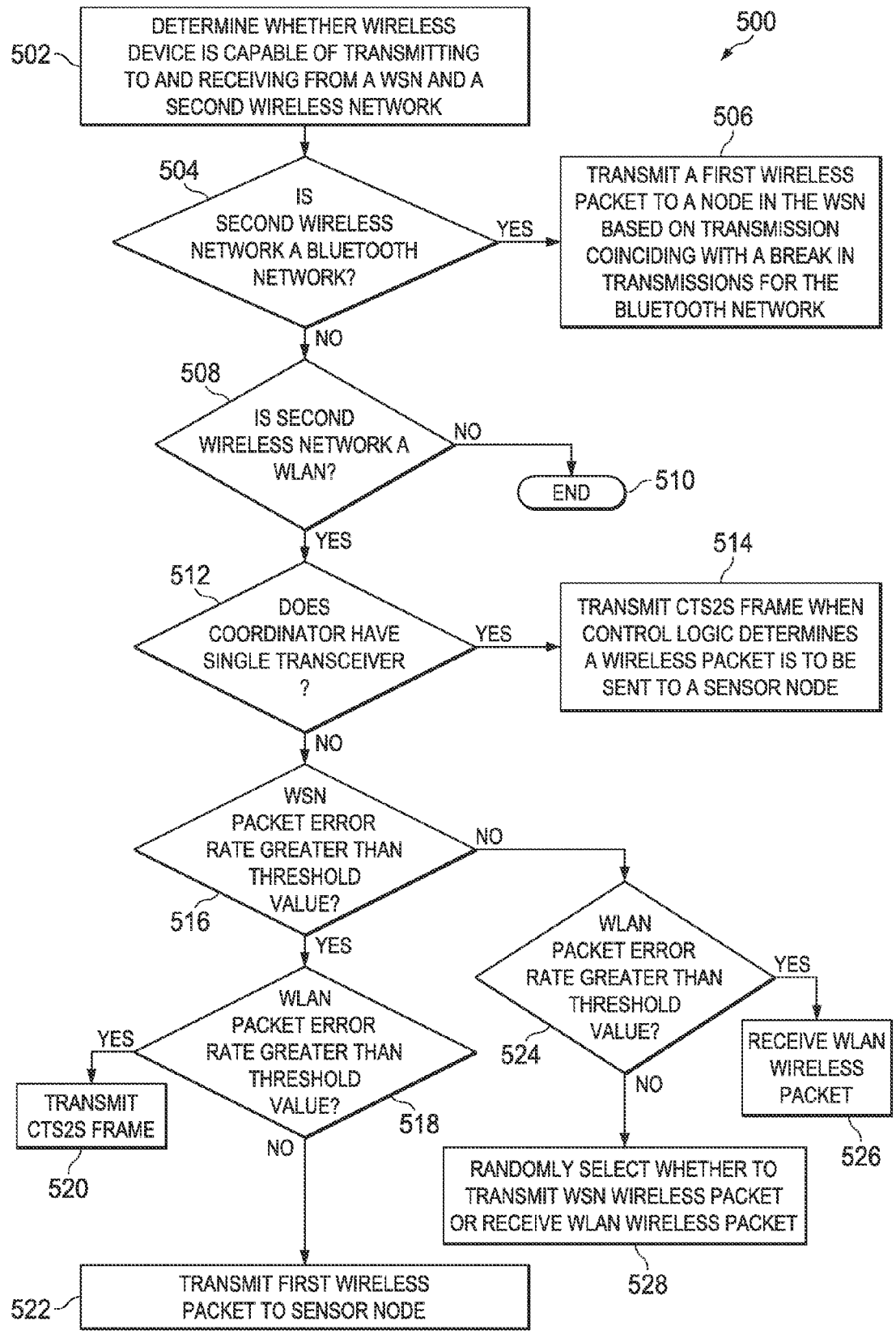

COEXISTENCE OF WIRELESS SENSOR NETWORKS WITH OTHER WIRELESS NETWORKS

CROSS-REFERENCE TO RELATED APPLICATION

The present application claims priority to U.S. Provisional Patent Application No. 61/618,041, filed on Mar. 30, 2012; which is hereby incorporated herein by reference in its entirety.

BACKGROUND

Wireless Sensor Networks (WSNs) are used in various application areas, including industrial process monitoring and control, environment and habitat monitoring, traffic control, building automation, healthcare applications, etc. Communication between a main node ("coordinator") of the WSN and nodes in the WSN is typically effectuated through the use of time synchronized channel hopping (TSCH) or coordinated sampled listening (CSL). In TSCH, communication in the WSN is effectuated utilizing slots consisting of instances of time intervals at different frequency channels. In CSL, communication in the WSN is effectuated by the coordinator transmitting a wake up sequence to the nodes which utilize periodic channel sampling to listen to the wake up sequence.

As wireless technologies proliferate, wireless devices incorporate systems based on a multiplicity of different wireless standards. For example, a WSN can accommodate a network based on the IEEE 802.15.4e standard, a wireless local area network ("WLAN"), such as network based on the IEEE 802.11 standard, and a wireless personal area network ("WPAN") (e.g., a BLUETOOTH network). Some of the various wireless standards adopted for use in wireless sensor devices use adjacent and/or overlapping portions of the wireless spectrum. For example, WSNs, BLUETOOTH networks, and IEEE 802.11b/g/n networks utilize the 2.4-2.5 gigahertz band.

SUMMARY

The problems noted above are solved in large part by systems and methods for coexistence of wireless sensor networks with other wireless networks. In some embodiments, a wireless device includes a first wireless transceiver and control logic coupled to the first wireless transceiver. The first wireless transceiver is configured to transmit to and receive from nodes in a wireless sensor network. The control logic causes the first wireless transceiver to transmit a wireless packet to a node in the wireless sensor network based on the transmission coinciding with a break in transmissions for a second wireless network. Based on the wireless transceiver being configured to transmit the wireless packets utilizing time synchronized channel hopping (TSCH), the control logic is configured to cause TSCH slot frames for wireless packet transmissions in the wireless sensor network to be time offset so as not to coincide with transmissions made on the second wireless network. Based on the wireless transceiver being configured to transmit the wireless packets utilizing coordinated sampled listening (CSL), the control logic is configured to cause wake up sequence transmissions for the wireless sensor network to be time offset so as not to coincide with the transmissions made on the second wireless network.

Another illustrative embodiment includes a wireless device that comprises a wireless transceiver and control logic coupled to the wireless transceiver. The wireless transceiver is configured to transmit to and receive from nodes in a wireless sensor network (WSN). The control logic causes the wireless transceiver to transmit a clear-to-send 2 self (CTS2S) frame based on the control logic making a determination to transmit a wireless packet to a node in the wireless sensor network. The control logic also causes the wireless transceiver to transmit a contention free end (CF-End) frame based on the wireless packet being transmitted to a sensor node in the WSN, and to not transmit a CF-End frame based on the wireless packet being transmitted to a coordinator node in the WSN.

Yet another illustrative embodiment is a wireless device including a first wireless transceiver, a second wireless transceiver, and control logic coupled to the first and second wireless transceivers. The first wireless transceiver is configured to transmit to and receive from nodes in a wireless sensor network (WSN). The second wireless transceiver is configured to transmit to and receive from nodes in a wireless local area network (WLAN). The control logic causes the first transceiver to transmit a first wireless packet based on a WSN packet error rate being greater than a first threshold value and a WLAN packet error rate being less than a second threshold level.

Another illustrative embodiment includes a method that comprises determining, by control logic, whether a wireless device is capable of transmitting to and receiving from a wireless sensor network (WSN) and a second wireless network. Based on the second wireless network being a BLUETOOTH network, transmitting, by a first wireless transceiver, a first wireless packet to a node in the WSN based on the transmission coinciding with a break in transmissions for the BLUETOOTH network. The method continues with, based on the second wireless network being a wireless local area network (WLAN), transmitting, by the first wireless transceiver, a clear-to-send 2 self (CTS2S) frame based on: the control logic making a determination to transmit the first wireless packet to a node in the WSN and that the first wireless transceiver is configured to transmit to and receive from both the WSN and the WLAN. Based on the second wireless network being a WLAN, transmitting, by the first wireless transceiver, the first wireless packet based on: a WSN packet error rate being greater than a first threshold value, a WLAN packet error rate being less than a second threshold value, the first wireless transceiver being configured to transmit to and receive from the WSN, and a second wireless transceiver being configured to transmit to and receive from the WLAN.

BRIEF DESCRIPTION OF THE DRAWINGS

For a detailed description of exemplary embodiments of the invention, reference will now be made to the accompanying drawings in which:

FIG. 5 shows a flow diagram of a coexistence of wireless sensor networks with other wireless networks method, in accordance with various embodiments.

NOTATION AND NOMENCLATURE

Figure 1:
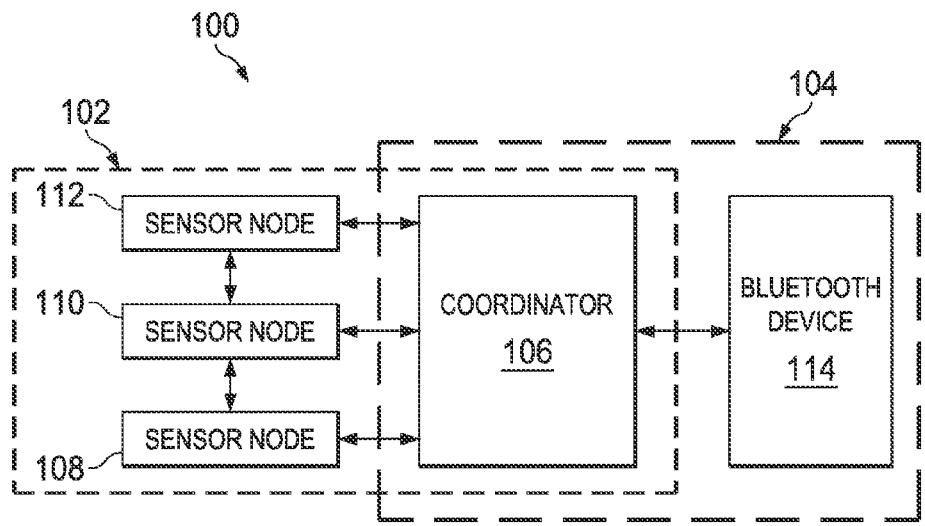
FIG. 1 shows a block diagram of an illustrative wireless sensor network (WSN) and BLUETOOTH network in accordance with various embodiments.

Certain terms are used throughout the following description and claims to refer to particular system components. As one skilled in the art will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct electrical connection. Thus, if a first device couples to a second device, that connection may be through a direct electrical connection, or through an indirect electrical connection via other devices and connections. Further, the term "software" includes any executable code capable of running on a processor, regardless of the media used to store the software. Thus, code stored in memory (e.g., non-volatile memory), and sometimes referred to as "embedded firmware," is included within the definition of software. The recitation "based on" is intended to mean "based at least in part on." Therefore, if X is based on Y, X may be based on Y and any number of other factors.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

A device capable of transmitting and receiving wireless packets from both a wireless sensor network (WSN) and a second wireless network, such as a BLUETOOTH network or a wireless local area network (WLAN), may have problems with interference due to the two wireless technologies operating in the same frequency band. In order to improve packet error rate and reduce the interference, a wireless device may, based on the second wireless network being a BLUETOOTH network, transmit wireless packets to sensor nodes in the WSN at times when the BLUETOOTH network is not transmitting data. If the device is transmitting to the WSN utilizing time synchronized channel hopping (TSCH), then the device may set the time offset for TSCH slot frames so as to not coincide with the time for BLUETOOTH transmissions. If the device is transmitting to the WSN utilizing coordinated sampled listening (CSL), the device may cause wake up sequence transmissions to be time offset so as not to coincide with transmissions made over the BLUETOOTH network. Thus, the transmissions made to the WSN network will not coincide with BLUETOOTH network transmissions, and interference is reduced.

If the second wireless network is a WLAN and the wireless device has a single transceiver for use communicating with both networks, then the device may transmit a clear-to-send 2 self (CTS2S) frame to stop transmissions over the WLAN whenever transmissions are needed over the WSN. However, if the coordinator is not the recipient of the WSN transmissions, or the reception ends before the duration set by the CTS2S frame is over, then a contention free end (CF-End) frame may be transmitted by the device allowing WLAN transmissions to resume.

If the second wireless network is a WLAN and the wireless device has dual transceivers for the two networks, then the device may transmit wireless packets over the WSN and postpone receipt of WLAN data whenever the WSN packet error rate exceeds a threshold value and the WLAN packet error rate is less than a threshold value. If the WLAN packet error rate exceeds a threshold value, then WSN wireless packet transmissions are postponed while receipt of WLAN data is allowed. If both the WSN and WLAN packet error rates exceed their respective threshold values, then the device transmits a CTS2S frame stopping WLAN transmissions. If however, both the WSN and WLAN packet error rate are lower than their respective threshold values, then the device randomly determines whether to transmit the WSN wireless packets or receive the WLAN transmission data.

FIG. 1 shows a block diagram of an illustrative network 100 including wireless sensor network (WSN) 102 and BLUETOOTH network 104 in accordance with various embodiments. WSN 102 may include coordinator 106 and a plurality of wireless sensor devices (108-112), also referred to as wireless sensor nodes or simply, sensor nodes, configured to communicate with one another in accordance with the IEEE 802.15.4e standard. Wireless sensor nodes 108-112 detect a condition of the environment in which they are disposed, and wirelessly communicate information indicative of the sensed environment to the coordinator 106. Each wireless sensor node may communicate with neighboring wireless sensor nodes to form an ad-hoc network in which a wireless sensor node repeats transmissions received from other sensor nodes to relay data through the WSN 102. Coordinator 106 may be configured to manage the sensor nodes 108-112, and connect WSN 102 with a second network, such as BLUETOOTH network 104 for remote data access. Coordinator 106 may receive measurement values and other information transmitted by the sensor nodes 108-112, and may provide control information to the sensor nodes 108-112. While, as a matter of convenience, FIG. 1 shows only three sensor nodes 108-112 and a single coordinator 106, in practice, the WSN 102 may include any number of sensor nodes and coordinators.

BLUETOOTH network 104 may include coordinator 106 and BLUETOOTH device 114 configured to communicate with one another in accordance with the BLUETOOTH protocol. While FIG. 1 shows only coordinator 106 and BLUETOOTH device 114, BLUETOOTH network 104 may include any number of devices. BLUETOOTH device 114 may be any device capable of communication using the BLUETOOTH protocol including, but not limited to, mobile phones, personal computers, laptop computers, tablet computers, media players, headsets, watches, etc. In an embodiment, BLUETOOTH device 114 acts as the master device while coordinator 106 acts as the slave device while in other embodiments coordinator 106 acts as the master device while BLUETOOTH device 114 acts as the slave. The master has unidirectional control over the slave device.

As shown in FIG. 1, coordinator 106 is configured to communicate with the sensor nodes 108-112 in the WSN 102 utilizing the IEEE 802.15.4e standard, and communicate with BLUETOOTH device 114 in BLUETOOTH network 104 utilizing the BLUETOOTH protocol. Both the IEEE 802.15.4e standard and the BLUETOOTH protocol utilize the 2.4-2.5 gigahertz band to communicate. Coordinator 106 is configured to allow the two communications standards, WSN utilizing the IEEE 802.15.4e standard and the BLUETOOTH protocol, to coexist and to transmit and receive communications utilizing both standards.

Figure 2A:
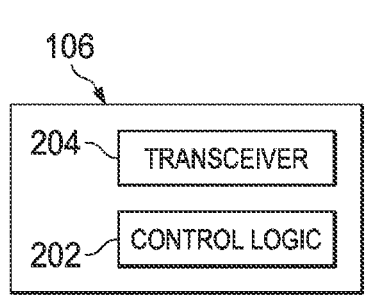
FIGS. 2A and 2B show block diagrams of an illustrative WSN coordinator configured to transmit and receive from both nodes in a WSN and BLUETOOTH devices in accordance with various embodiments.
Figure 2B:
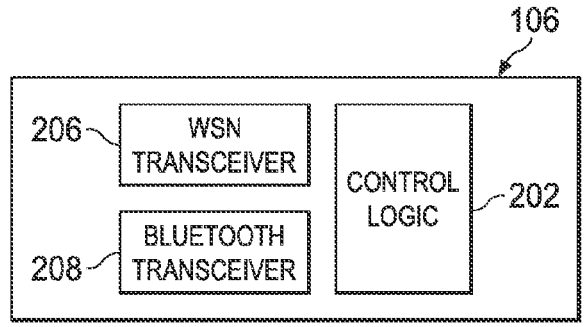

FIGS. 2A and 2B show block diagrams of an illustrative coordinator 106 configured to transmit and receive from both sensor nodes 108-112 in the WSN 102 and BLUETOOTH device 114 in accordance with various embodiments. In FIG. 2A, coordinator 106 includes control logic 202 and wireless transceiver 204. Wireless transceiver 204 transmits and receives wireless communications in accordance with both the WSN communications standards and the BLUETOOTH protocol. For example, wireless transceiver 204 may be capable of transmitting to and receiving from wireless sensors 108-112 and transmitting to and receiving from BLUETOOTH device 114. Transceiver 204 is coupled to control logic 202 which coordinates the operation of the wireless transceiver 204.

If the coordinator 106 is a slave device in the BLUETOOTH network 104, the control logic 202 may cause the wireless transceiver 204 to transmit wireless packets to sensor nodes 108-112 in the WSN 102 such that the wireless packets coincide with a break in transmissions in BLUETOOTH network 104. While coordinator 106 has no control over the set of frequency channels over which BLUETOOTH communications are occurring and the timing of the BLUETOOTH communications, it does have control over the communications in the WSN 102.

Communications in WSN 102 may be effectuated through the use of time synchronized channel hopping (TSCH) or coordinated sampled listening (CSL). In TSCH, communication in the WSN is effectuated utilizing slots consisting of instances of time intervals at different frequency channels. Slots may be further categorized as shared slots, dedicated slots, beacon slots, and free slots. In a shared slot, any sensor node 108-112 may transmit unicast or broadcast packets to any other sensor node 108-112 or coordinator 106. In a dedicated slot, the slot is allocated to one or more of sensor nodes 108-112 to transmit to other sensor node 108-112 or coordinator 106. A beacon slot is a slot utilized for beacon transmissions. A free slot, is any slot that is not categorized. In CSL, communication in the WSN is effectuated by the coordinator 106 transmitting a wake up sequence to one or more of sensor nodes 108-112 which utilize periodic channel sampling to listen to the wake up sequence.

At the time of BLUETOOTH setup, BLUETOOTH device 114, acting as the master device, may communicate to coordinator 106 the timing of slot frames for BLUETOOTH transmissions. Coordinator 106 may also transmit a request communication to BLUETOOTH device 114 requesting the timing of the slot frames for BLUETOOTH transmissions. BLUETOOTH transmissions may be very predictable, such that slot frames are assigned for BLUETOOTH transmissions with a time offset until the next slot frame for BLUETOOTH transmission. Thus, to effectuate the WSN 102 coexisting with BLUETOOTH network 114, control logic 202 may assign TSCH slot frames for dedicated, shared, and/or beacon slots to the time offset period for BLUETOOTH transmissions. Hence, the TSCH frame for transmissions to the WSN 102 would coincide with a break in transmissions for the BLUETOOTH network 104. The WSN 102 TSCH transmissions may also contain a time offset from slot frame to slot frame. In an embodiment, the time offset for the TSCH transmissions would be the length of time of the BLUETOOTH transmission frame. Thus, the WSN 102 TSCH transmissions would not coincide with BLUETOOTH transmissions. If the WSN 102 TSCH transmissions do coincide with BLUETOOTH transmissions, then, in an embodiment, the TSCH transmissions time offset may be changed by control logic 202, so as to minimize any overlap of transmission frames. If an overlap of WSN 102 TSCH transmissions and BLUETOOTH transmissions is unavoidable, control logic 202 sets a time offset for WSN 102 TSCH transmissions such that the overlap is minimized.

To effectuate the WSN 102 coexistence with BLUETOOTH network 114, control logic 202 may delay WSN 102 CSL transmissions so as not to coincide with BLUETOOTH transmissions. In an embodiment, WSN 102 CSL transmissions are delayed by control logic 202 causing the wake up sequence transmission to be time offset so as not to coincide with the transmissions made on the BLUETOOTH network 104. Reception may be delayed by avoiding channel sampling for a time interval during which BLUETOOTH communications will occur.

If the coordinator 106 is the master device in the BLUETOOTH network 104 the control logic 202 may cause the wireless transceiver 204 to transmit wireless packets to sensor nodes 108-112 in the WSN 102 such that the wireless packets coincide with a break in transmissions in BLUETOOTH network 104 in a similar manner as noted above as if the coordinator 106 is the slave device. Additionally, coordinator 106 would also control the set of frequency channels over which BLUETOOTH communications are occurring and the timing of the BLUETOOTH communications. In an embodiment, control logic 202 would alter the timing of BLUETOOTH communications so as to not coincide with WSN 102 transmissions.

In FIG. 2B, coordinator 106 includes control logic 202, WSN wireless transceiver 206, and BLUETOOTH wireless transceiver 208. WSN wireless transceiver 206 may be configured to transmit to and receive from the sensor nodes 108-112. BLUETOOTH wireless transceiver 208 may be configured to transmit to and receive from BLUETOOTH device 114. In an embodiment, the control logic 202 causes the WSN transceiver 206 to transmit a wireless packet to one or more of sensor nodes 108-112 at a time coinciding with a break in transmissions for BLUETOOTH network 104. This is accomplished in a similar way as discussed in FIG. 2A with one wireless transceiver. If the time offset for the WSN 102 transmissions overlap with the BLUETOOTH network 104 transmissions, then control logic 202 may change the time offset for WSN TSCH transmissions and/or delay transmission/reception in CSL in the same manner as discussed in FIG. 2A with a single transceiver.

Figure 3:
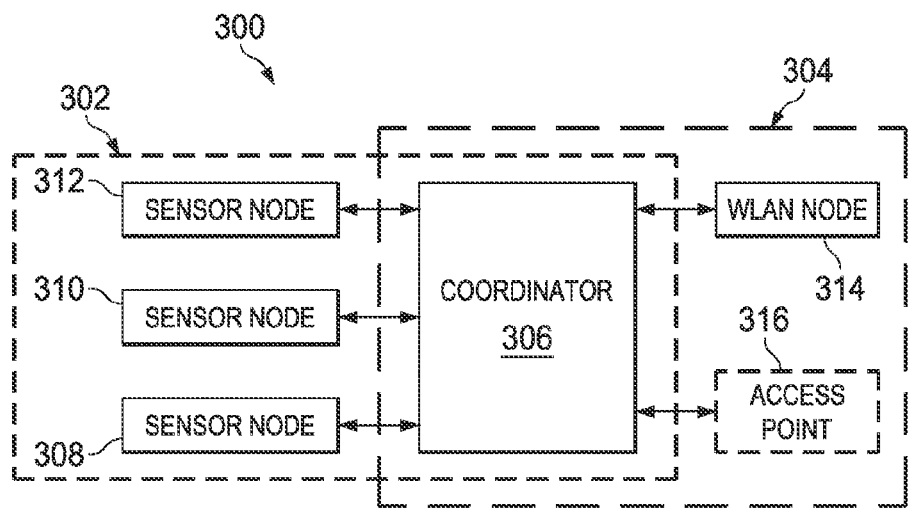
FIG. 3 shows a block diagram of an illustrative WSN and wireless local area network (WLAN) in accordance with various embodiments.

FIG. 3 shows a block diagram of an illustrative network 300 including WSN 302 and wireless local area network (WLAN) 304 in accordance with various embodiments. WSN 302 may include coordinator 306 and a plurality of wireless sensor nodes (308-312) configured to communicate with one another in accordance with the IEEE 802.15.4.e standard. Wireless sensor nodes 308-312 act in a similar manner to sensor nodes 108-112 from FIG. 1. Coordinator 306 may be configured to manage the sensor nodes 308-312, and connect WSN 302 with WLAN 304 for remote data access. While, as a matter of convenience, FIG. 3 shows only three sensor nodes 308-312 and a single coordinator 306, in practice, the WSN 302 may include any number of sensor nodes and coordinators.

WLAN 304 may include coordinator 306, WLAN node 314, and in some embodiments access point 316. While FIG. 3 shows only coordinator 306, WLAN node 314, and access point 316, WLAN 304 may include any number of nodes and access points. WLAN node 314 may be any device capable of communicating using the IEEE 802.11 standard including, but not limited to, mobile phones, personal computers, laptop computers, tablet computers, media players, headsets, watches, etc. In an embodiment, coordinator 306 acts as a node in the WLAN 304 and access point 316 is included in WLAN 304. Access point 316 acts as a wireless access point which allows other wireless devices, such as coordinator 306 and WLAN node 314 to connect to WLAN 304. In other embodiments, coordinator 306 may act as the WLAN 304 access point, and access point 316 would not be included in WLAN 304.

Coordinator 306 is configured to communicate with the sensor nodes 308-312 in the WSN 302 utilizing the IEEE 802.15.4.e standard, and communicate with WLAN node 314, and in some embodiments access point 316, utilizing the IEEE 802.11 standard. Both the IEEE 802.15.4.e and IEEE 802.11 standards utilize the 2.4-2.5 gigahertz band to communicate. Coordinator 306 is configured to allow the two communications standards to coexist and to transmit and receive communications utilizing both standards.

Figure 4A:
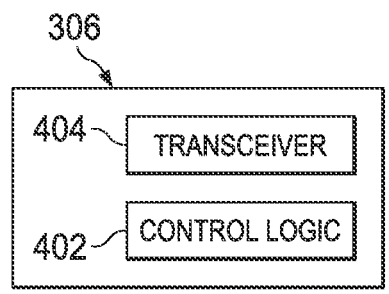
FIGS. 4A and 4B show a block diagram of an illustrative WSN coordinator configured to transmit and receive from both nodes in a WSN and nodes and/or access points in a WLAN in accordance with various embodiments.
Figure 4B:
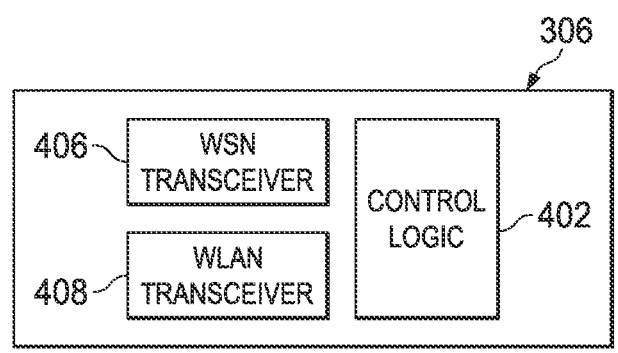

FIGS. 4A and 4B show block diagrams of an illustrative coordinator 306 configured to transmit and receive from both sensor nodes 308-312 in the WSN 302 and WLAN node 314, and in some embodiments access point 316, in WLAN 304 in accordance with various embodiments. In FIG. 4A, coordinator 306 includes control logic 402 and wireless transceiver 404. Wireless transceiver 404 transmits and receives wireless communications in accordance with both the WSN communications standards and the IEEE 802.11 standard. For example, wireless transceiver 404 may be capable of transmitting to and receiving from wireless sensors 308-312 utilizing TSCH and/or CSL and transmitting to and receiving from WLAN node 314 and access point 316. Transceiver 404 is coupled to control logic 402 which coordinates the operation of the wireless transceiver 404.

In an embodiment, coordinator 306 is a node within WLAN 304 and does not act as an access point. Coordinator 306 may be placed in a power save mode. In the power save mode, coordinator 306 may not be able to receive wireless packets from access point 316 while it is in a sleep state. To receive wireless packets, control logic 402 may cause transceiver 404 to transmit a signal to access point 316 notifying the access point 316, that coordinator 306 is in an awake state. After the access point 316 receives the signal that coordinator 306 is awake, it may transmit wireless packets to coordinator 306 at any time. To protect itself from an avalanche effect associated with missing wireless packets, the control logic 402 may cause transceiver 404 to transmit a clear-to-send 2 self (CTS2S) frame across the WLAN 304 so that it may transmit and receive communications to and from sensor nodes 308-312 in WSN 302. The CTS2S frame commands WLAN node 314 and access point 316 in WLAN 304 to avoid transmitting on the WLAN 304 for a period of time indicated in the CTS2S frame itself. During receiving mode, coordinator 306 may receive a wireless packet from one of sensor nodes 308-312. Control logic 402 may decode the header portion of the packet and cause transceiver 404 to transmit a contention free end (CF-End) frame to WLAN node 314 and access point 316 in WLAN 304 to release the WLAN 304 from the effects of the CTS2S frame based on the packet not being directed towards the coordinator 306. Thus, after transmitting the CF-End frame, normal communications may occur across WLAN 304. If coordinator 306 is placed in an active mode, such that it is always awake, then the same procedure of transmitting CTS2S frames and CF-End frames may be utilized, only the coordinator 306 would not need to transmit a signal to access point 316 notifying access point 316 that coordinator 306 is in an awake state.

In another embodiment, coordinator 306 acts as the access point for WLAN 304. In this embodiment, access point 316 does not exist in WLAN 304. To protect communications made within WSN 302, coordinator 306 utilizes the same procedure as if coordinator 306 is a node within the WLAN 304 except that coordinator 306 cannot operate in a power save mode and must act in an active mode. Thus, coordinator 306 transmits CTS2S frames and CF-End frames in the same manner as discussed above as if the coordinator 306 is a node in the WLAN 304.

In FIG. 4B, coordinator 306 includes control logic 402, WSN wireless transceiver 406, and WLAN transceiver 408. WSN wireless transceiver 406 may be configured to transmit to and receive from the sensor nodes 308-312. WLAN wireless transceiver 408 may be configured to transmit to and receive from WLAN device 314, and in some embodiments, access point 316. Because coordinator 306 has a transceiver dedicated to WSN 302 communications and a transceiver dedicated to WLAN 304 communications, theoretically, coordinator 406 could transmit and receive WSN 302 communications at the same time as it transmits and receives WLAN 304 communications. However, if coordinator 406 transmits communications over one of the networks WSN 302 or WLAN 304 while receiving communications over the other network, the receiver of the other network may become saturated and cause communication errors.

To avoid these communications errors, control logic 302 may be configured to cause the transceiver 406 to transmit a wireless packet to one of sensor nodes 308-312 and not receive or continue to receive a WLAN wireless packet based on a WSN packet error rate being greater than a threshold value while the WLAN packet error rate is less than a threshold value even if the remaining duration for coordinator 306 to receive a WLAN 304 wireless packet transmission overlaps a TSCH and/or CSL transmission over the WSN 302. The WSN packet error rate is the ratio of the number of incorrectly received wireless packets transmitted in WSN 302 to the total number of received packets in WSN 302. The WLAN packet error rate is the ratio of the number of incorrectly received wireless packets transmitted in WLAN 304 to the total number of received wireless packets transmitted in WLAN 304. In an embodiment, the threshold values for the WSN and WLAN packet error rate are predetermined. In an embodiment, the WSN packet error rate threshold value is the same as the WLAN packet error rate threshold value, while in other embodiments they are different. By transmitting the wireless packet over the WSN 302 instead of postponing the transmission, the WSN packet error rate may be reduced.

However, if the WLAN packet error rate is greater than a threshold value, then control logic 402 causes the transceiver 408 to receive the WLAN wireless packet while postponing the WSN wireless packet. This may lower the WLAN packet error rate.

In an embodiment, if both the WSN packet error rate and the WLAN packet error rate are greater than their respective threshold values, then control logic 402 may cause transceiver 408 to transmit a CTS2S frame to WLAN 314 and access point 316 in WLAN 304. If, however, the WSN packet error rate and the WLAN packet error rate are less than their respective threshold levels, the control logic 402 causes either transceiver 406 to transmit the wireless packet to the sensor nodes 308-312 or causes the transceiver 408 to receive the WLAN wireless packet based on a random determination by control logic 402.

FIG. 5 shows a flow diagram of a coexistence of a wireless sensor networks 102 and 302 with other wireless networks 104 and 304 method 500, in accordance with various embodiments. In block 502, a determination is made, by control logic 202 or 402 whether coordinator 106 or 306 is capable of transmitting to and receiving from WSN 102 or 302 and a second wireless network.

In block 504, a determination is made as to whether the second wireless network is a BLUETOOTH network 104. If the second wireless network is a BLUETOOTH network 104, then in block 506, the method continues by transmitting, by a first wireless transceiver a first wireless packet to a sensor node 108-112 in the WSN 102 based on the transmission coinciding with a break in transmissions for the BLUETOOTH network 104.

If the second wireless network is not a BLUETOOTH network, then in block 508, a determination is made whether the second wireless network is a WLAN 304. If the second wireless network is not a WLAN 304, the method ends in block 510. However, if the second wireless network is a WLAN 304, then a determination is made as to whether coordinator 306 has a single transceiver 404 for transmitting to and receiving from the sensor nodes 308-312 in WSN 302 and the WLAN device 314 and access point 316 in WLAN 304, as shown in block 512.

In block 514, if the coordinator 306 does have only a single transceiver 404, then the method continues with transmitting a CTS2S frame when control logic 402 determines a wireless packet is to be transmitted to a sensor node 308-312 in WSN 302. However, if the determination is made, in block 512, that the coordinator 306 does not have a single transceiver, but instead has a WSN transceiver 406 and a WLAN transceiver 408, then a determination is made as to whether a WSN packet error rate is greater than a threshold value, as shown in block 516.

If the WSN packet error rate is greater than a threshold value, then a determination is made whether the WLAN packet error rate is greater than a threshold value, as shown in block 518. If the WLAN packet error rate is greater than a threshold value, in block 520, the method continues with transmitting a CTS2S frame to WLAN device 314 and access point 316. However if the WLAN packet error rate is not greater than a threshold value, then, in block 522, the method continues with transmitting the first wireless packet to a sensor node 308-312.

If in block 516, the WSN packet error rate is not greater than a threshold level, then a determination is made whether the WLAN packet error rate is greater than a threshold level, as shown in block 524. If the WLAN packet error rate is greater than a threshold level, then in block 526, the method continues with receiving a WLAN wireless packet. However, if the WLAN packet error rate is not greater than a threshold level, then, in block 526, the method continues with control logic 402 randomly selecting whether to transmit the first wireless packet to sensor nodes 308-312 in WSN 302 or receiving a WLAN wireless packet from WLAN device 314 or access point 316.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A wireless device, comprising:
   a first wireless transceiver configured to transmit to and receive from nodes in a wireless sensor network; and
   control logic coupled to the first wireless transceiver, wherein the control logic causes the first wireless transceiver to transmit a wireless packet to a node in the wireless sensor network based on the transmission coinciding with a break in transmissions for a second wireless network;
   wherein, based on the first wireless transceiver being configured to transmit the wireless packets utilizing time synchronized channel hopping (TSCH), the control logic is configured to cause TSCH slot frames for wireless packet transmissions in the wireless sensor network to be time offset so as not to coincide with transmissions made on the second wireless network; and
   wherein, based on the first wireless transceiver being configured to transmit the wireless packets utilizing coordinated sampled listening (CSL), the control logic is further configured to cause wake up sequence transmissions for the wireless sensor network to be time offset so as not to coincide with the transmissions made on the second wireless network.

2. The wireless device of claim 1, further comprising a second wireless transceiver configured to transmit to and receive from nodes in the second wireless network.

3. The wireless device of claim 1, wherein the first wireless transceiver is further configured to transmit to and receive from nodes in the second wireless network.

4. The wireless device of claim 1, wherein the second wireless network is a BLUETOOTH network.

5. The wireless device of claim 1, wherein control logic further causes the time offset for wireless packet transmissions in the wireless sensor network to be changed based on the time offset overlapping in time with transmissions made by the second wireless network.

6. A wireless device, comprising:
   a wireless transceiver configured to transmit to and receive from nodes in a wireless sensor network (WSN); and
   control logic coupled to the wireless transceiver, wherein the control logic causes the wireless transceiver to transmit a clear-to-send 2 self (CTS2S) frame based on the control logic making a determination to transmit a wireless packet to a node in the WSN,
   wherein the control logic further causes the wireless transceiver to transmit a contention free end (CF-End) frame based on the wireless packet being transmitted to a sensor node in the WSN and to not transmit a CF-End frame based on the wireless packet being transmitted to a coordinator node in the WSN.

7. The wireless device of claim 6, wherein the wireless transceiver is further configured to transmit to and receive from nodes in the second wireless network.

8. The wireless device of claim 6, wherein the second wireless network is wireless local area network (WLAN).

9. The wireless device of claim 6, wherein the wireless transceiver is configured to transmit the wireless packet utilizing time synchronized channel hopping (TSCH).

10. The wireless device of claim 6, wherein the wireless transceiver is configured to transmit the wireless packet utilizing coordinated sampled listening (CSL).

11. A wireless device, comprising:
    a first wireless transceiver configured to transmit to and receive from nodes in a wireless sensor network (WSN);
    a second wireless transceiver configured to transmit to and receive from nodes in a wireless local area network (WLAN); and
    control logic coupled to the first and second wireless transceivers, wherein the control logic causes the first transceiver to transmit a first wireless packet based on a WSN packet error rate being greater than a first threshold value and a WLAN packet error rate being less than a second threshold value and wherein the control logic causes the second wireless transceiver to receive a second wireless packet over the WLAN based on the WLAN packet error rate being greater than the second threshold value.

12. The wireless device of claim 11, wherein the control logic causes the second wireless transceiver to transmit a clear-to-send 2 self (CTS2S) frame based on the WSN packet error rate being greater than the first threshold value and the WLAN packet error rate being greater than the second threshold value.

13. The wireless device of claim 11, wherein the control logic randomly determines whether to cause the first wireless transceiver to transmit the first wireless packet or cause the second wireless transceiver to receive the second wireless packet based on the WSN packet error rate being less than the first threshold value and the WLAN packet error rate being less than the second threshold value.

14. A method comprising:
determining, by control logic, whether a wireless device is capable of transmitting to and receiving from a wireless sensor network (WSN) and a second wireless network;
based on the second wireless network being a BLUETOOTH network, transmitting, by a first wireless transceiver, a first wireless packet to a node in the WSN based on the transmission coinciding with a break in transmissions for the BLUETOOTH network; and
based on the second wireless network being a wireless local area network (WLAN):
transmitting, by the first wireless transceiver, a clear-to-send 2 self (CTS2S) frame based on:
the control logic making a determination to transmit the first wireless packet to a node in the WSN; and
the first wireless transceiver being configured to transmit to and receive from both the WSN and the WLAN; and
transmitting, by the first wireless transceiver, the first wireless packet to a node in the WSN based on:
a WSN packet error rate being greater than a first threshold value and a WLAN packet error rate being less than a second threshold value; and
the first wireless transceiver being configured to transmit to and receive from the WSN and a second wireless transceiver being configured to transmit to and receive from the WLAN.

15. The method of claim 14, further comprising based on the second wireless network being the WLAN and the first wireless transceiver being configured to transmit to and receive from the WSN and a second wireless transceiver being configured to transmit to and receive from the WLAN, receiving, by the second wireless transceiver, a second wireless packet over the WLAN based on the WLAN packet error rate being greater than the second threshold value.

16. The method of claim 14, further comprising based on the second wireless network being the WLAN and the first wireless transceiver being configured to transmit to and receive from the WSN and a second wireless transceiver being configured to transmit to and receive from the WLAN, transmitting, by the second wireless transceiver, a clear-to-send 2 self (CTS2S) frame based on the WSN packet error rate being greater than the first threshold value and the WLAN packet error rate being greater than the second threshold value.

17. The method of claim 14, further comprising based on the second wireless network being the WLAN and the first wireless transceiver being configured to transmit to and receive from the WSN and a second wireless transceiver being configured to transmit to and receive from the WLAN, randomly determining whether to transmit, by the first wireless transceiver, the first wireless packet or receive, by the second wireless transceiver, the second wireless packet based on the WSN packet error rate being less than the first threshold value and the WLAN packet error rate being less than the second threshold value.

* * * * *